(12) United States Patent
Cho et al.

(10) Patent No.: US 11,474,613 B2
(45) Date of Patent: Oct. 18, 2022

(54) GESTURE RECOGNITION DEVICE AND METHOD USING RADAR

(71) Applicant: IUCF-HYU (Industry-University Cooperation Foundation Hanyang University), Seoul (KR)

(72) Inventors: Sung Ho Cho, Seoul (KR); Faheem Khan, Seoul (KR); Jeong Woo Choi, Seoul (KR); Seong Kyu Leem, Seoul (KR)

(73) Assignee: IUCF-HYU (Industry-University Cooperation Foundation Hanyang University), Seoul (KR)

(*) Notice: Subject to any disclaimer, the term of this patent is extended or adjusted under 35 U.S.C. 154(b) by 58 days.

(21) Appl. No.: 16/964,687

(22) PCT Filed: Jan. 25, 2019

(86) PCT No.: PCT/KR2019/001115
§ 371 (c)(1),
(2) Date: Jul. 24, 2020

(87) PCT Pub. No.: WO2019/147076
PCT Pub. Date: Aug. 1, 2019

(65) Prior Publication Data
US 2020/0348761 A1    Nov. 5, 2020

(30) Foreign Application Priority Data

Jan. 26, 2018 (KR) ........................ 10-2018-0010200

(51) Int. Cl.
*G06F 3/01* (2006.01)
*G01S 7/41* (2006.01)
*G01S 13/88* (2006.01)

(52) U.S. Cl.
CPC .............. *G06F 3/017* (2013.01); *G01S 7/415* (2013.01); *G01S 13/88* (2013.01)

(58) Field of Classification Search
CPC .......... G06F 3/017; G01S 7/415; G01S 13/88; G01S 13/08; G01S 7/356; G01S 13/5244;
(Continued)

(56) References Cited

U.S. PATENT DOCUMENTS 7,830,297 B1 * 11/2010 Wang ...................... G01S 7/021
342/13
8,223,589 B2 * 7/2012 Liu ........................ G06V 40/20
367/96

(Continued)

FOREIGN PATENT DOCUMENTS

KR    10-2013-0040642 A    4/2013
KR    10-2015-0114868 A    10/2015
(Continued)

OTHER PUBLICATIONS

Khan et al. Hand-Based Gesture Recognition for Vehicular Applications Using IR-UWB Radar. Sensors 2017. MDPI Apr. 1, 2017, pp. 1-18 See pp. 2-16 (2017).*

(Continued)

*Primary Examiner* — Grant Sitta
(74) *Attorney, Agent, or Firm* — Novick, Kim & Lee, PLLC; Jae Youn Kim

(57) ABSTRACT

A gesture recognition device and method using radar are proposed. The gesture recognition device includes: a signal receiving unit for receiving a radar signal reflected by a gesture of a user; a clutter removing unit for removing clutter from the signal received by the signal receiving unit; and a signal magnitude variance acquiring unit for acquiring the variance of a signal magnitude from a reflection signal from which the clutter has been removed. The proposed (Continued)

device and method have an advantage of enabling a gesture to be recognized with performance that is robust to changes in distance and direction between a user and a radar sensor.

15 Claims, 8 Drawing Sheets

(58) Field of Classification Search
CPC ........... G06K 9/00355; G06K 9/00496; G06K 9/6223; G06V 40/28
See application file for complete search history.

(56) References Cited

U.S. PATENT DOCUMENTS

| | | | | |
|---|---|---|---|---|
| 8,345,920 | B2* | 1/2013 | Ferren | G06F 3/0425 382/103 |
| 8,660,300 | B2* | 2/2014 | Svajda | G06V 40/28 348/169 |
| 8,768,006 | B2* | 7/2014 | Subramanian | G06V 20/64 382/165 |
| 9,551,758 | B2* | 1/2017 | Bourilkov | G01R 31/371 |
| 9,971,020 | B1* | 5/2018 | Maher | G11C 11/409 |
| 2012/0001875 | A1* | 1/2012 | Li | G06F 3/017 345/177 |
| 2012/0200486 | A1* | 8/2012 | Meinel | H04N 5/33 345/156 |
| 2012/0319819 | A1* | 12/2012 | Tkachenko | G01S 13/878 340/10.1 |
| 2013/0082858 | A1* | 4/2013 | Chambers | G06N 99/00 342/22 |
| 2014/0313071 | A1* | 10/2014 | McCorkle | G01S 13/106 342/202 |
| 2015/0277569 | A1 | 10/2015 | Gwin et al. | |
| 2016/0213258 | A1* | 7/2016 | Lashkari | G01S 15/8915 |
| 2016/0320852 | A1 | 11/2016 | Poupyrev | |
| 2018/0307319 | A1* | 10/2018 | Karmon | G06K 9/00389 |
| 2019/0383927 | A1* | 12/2019 | Mihajlovic | G01S 7/03 |
| 2020/0132812 | A1* | 4/2020 | Dvorecki | G01S 7/4008 |
| 2020/0191913 | A1* | 6/2020 | Zhang | G01S 7/412 |
| 2020/0256974 | A1* | 8/2020 | Kim | G01S 13/0209 |
| 2020/0341546 | A1* | 10/2020 | Yuan | G06F 3/167 |
| 2020/0355817 | A1* | 11/2020 | Gillian | G01S 7/354 |
| 2020/0383580 | A1* | 12/2020 | Shouldice | B60W 40/08 |
| 2021/0326642 | A1* | 10/2021 | Gillian | G01S 13/66 |

FOREIGN PATENT DOCUMENTS

| | | |
|---|---|---|
| KR | 10-2015-0121949 A | 10/2015 |
| KR | 10-2017-0012422 A | 2/2017 |
| KR | 10-1788784 B1 | 10/2017 |

OTHER PUBLICATIONS

Khan et al. Hand-Based Gesture Recognition for Vehicular Applications Using IR-UWB Radar. Sensors 2017. MDPI Apr. 11, 2017, pp. 1-18 See pp. 2-16.

* cited by examiner

GESTURE RECOGNITION DEVICE AND METHOD USING RADAR

CROSS-REFERENCE TO RELATED APPLICATIONS

This application is a National Phase Application of PCT International Application No. PCT/KR2019/001115, which was filed on Jan. 25, 2019, and which claims priority from Korean Patent Application No. 10-2018-0010200 filed on Jan. 26, 2018. The disclosures of the above patent applications are incorporated herein by reference in their entirety.

BACKGROUND

1. Technical Field

The present invention relates to a gesture recognition device and method, more particularly to a gesture recognition device and method using a radar.

2. Description of the Related Art

In recent times, automobiles are manufactured in the form of smart cars that provide various functions, and while such smart cars require many types of interfaces to utilize the various functions, entering appropriate interface inputs in a driving environment may not be an easy task and may also have a serious impact on safety.

For these reasons, various research efforts have focused on the recognition of hand gestures. Typical gesture recognition methods may include methods that involve recognizing gestures captured with a camera and methods that utilize a wearable device such as a data glove.

Gesture recognition using a camera may require a LoS (line of sight) relationship between the hand and the camera and may face difficulties in proper gesture recognition in environments where lighting is insufficient. In particular, since bright lighting is not always available during driving, such methods may be inadequate for recognizing the gestures of a driver.

Also, whereas gesture recognition using a wearable device is not limited by lighting conditions, etc., a high costs may be needed, and users may have to undergo a complicated training procedure to properly implement gesture recognition.

There has also been research on recognizing gestures by using a radar, but gesture recognition using a radar would incur large deviations in recognition performance depending on the distance between the radar sensor and the user and on the orientations of the radar sensor and the user, so that a high level of reliability cannot be guaranteed.

SUMMARY OF THE INVENTION

To resolve the problems in the related art described above, a gesture recognition device and method using a radar are provided, which are robust against changes in distance and orientation between the user and the radar sensor.

Also, the present invention provides a gesture recognition device and method using a radar that can respond to lighting and environmental changes and can be effectively applied to a driver.

One aspect of the present invention, conceived to achieve the objectives above, provides a gesture recognition device using a radar that includes: a signal receiver unit configured to receive radar signals reflected by a gesture of a user; a clutter remover unit configured to remove clutter from the signals received at the signal receiver unit; a signal intensity variance acquirer unit configured to acquire a variance of signal intensity values from the reflected signals from which the clutter has been removed; a ToA variance acquirer unit configured to acquire ToA's (times of arrival) corresponding to maximum values of fast time signals forming the reflected signals from which the clutter has been removed and configured to acquire a variance of the acquired ToA's corresponding to the maximum values; a frequency acquirer unit configured to compute a frequency of the reflected signals from which the clutter has been removed; a reference database configured to store reference feature information of a predetermined multiple number of reference gestures; and a gesture recognition unit configured to determine which reference gesture a gesture of the user corresponds to by using the signal intensity variance, the maximum value ToA variance, the frequency, and the reference feature information stored in the reference database.

The gesture recognition device may further include a fitting unit configured to determine whether or not a gesture is an intended gesture having intentional periodicity in the reflected signals from which the clutter has been removed.

The frequency acquirer unit may determine whether the gesture of the user is a gesture with a large movement or a gesture with a small movement based on the maximum value ToA variance.

If it is determined that the gesture of the user is a gesture with a small movement, the frequency acquirer unit may perform a FFT on the reflected signals from which the clutter has been removed to compute the frequency.

If it is determined that the gesture of the user is a gesture with a large movement, the frequency acquirer unit may compute the frequency by subtracting an average of the ToA's corresponding to the maximum values from the ToA corresponding to the maximum value for each of the fast time signals and performing a FFT on the resultant signals.

The fitting unit may determine whether or not a signal has periodicity by way of a sinusoidal fitting for a gesture with a small movement and determines whether or not a signal has periodicity by way of an R-square fitting for a gesture with a large movement.

The reference feature information may include a signal intensity variance, a maximum value ToA variance, and K-means clustering information for frequency for each reference gesture.

The gesture recognition unit may recognize a gesture by using the signal intensity variance, maximum value ToA variance, and frequency acquired from the gesture of the user and distance information from a cluster center in a K-means space for each of the reference gestures.

The gesture recognition unit may perform gesture recognition after normalizing the signal intensity variance, maximum value ToA variance, and frequency.

Another aspect of the present invention provides a gesture recognition method using a radar that includes: (a) receiving radar signals reflected by a gesture of a user; (b) removing clutter from the signals received at step (a); (c) acquiring a signal intensity variance from the reflected signals from which the clutter has been removed; (d) acquiring ToA's (times of arrival) corresponding to maximum values of fast time signals forming the reflected signals from which the clutter has been removed and acquiring a maximum value ToA variance defined as a variance of the acquired ToA's corresponding to the maximum values; (e) computing and acquiring a frequency of the reflected signals from which the clutter has been removed; and (f) determining which reference gesture a gesture of the user corresponds to by using reference feature information of a predetermined multiple number of reference gestures and the signal intensity variance, the maximum value ToA variance, and the frequency.

The present invention provides the advantage of enabling gesture recognition with a performance robust against changes in distance and orientation between the user and the radar sensor.

DETAILED DESCRIPTION OF THE INVENTION

Figure 1:
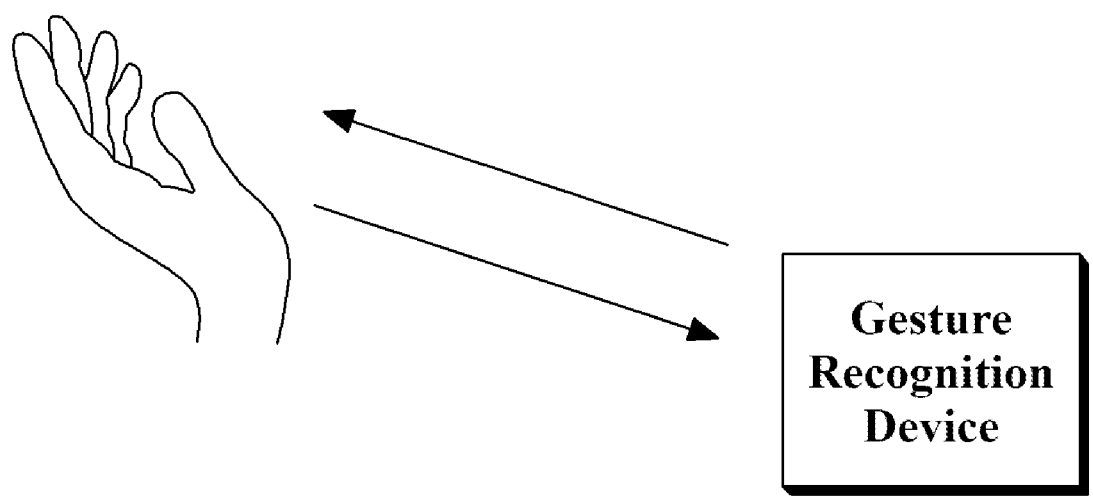
FIG. 1 illustrates the operational structure of a gesture recognition device according to an embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In describing the drawings, similar reference numerals are used for similar elements.

While such terms as "first" and "second," etc., may be used to describe various elements, such elements must not be limited to the above terms. The above terms are used only to distinguish one element from another. For example, a first element may be referred to as a second element without departing from the scope of rights of the present invention, and likewise a second element may be referred to as a first element. Certain embodiments of the present invention are described below in more detail with reference to the accompanying drawings.

FIG. 1 illustrates the operational structure of a gesture recognition device according to an embodiment of the present invention.

Referring to FIG. 1, a gesture recognition device according to an embodiment of the present invention may receive reflection signals corresponding to a gesture of a user and may analyze the received reflection signals to recognize the gesture of the user.

Here, gesture actions of which recognition is desired (hereinafter referred to as "reference gestures") may be determined beforehand, and a gesture recognition device based on the present invention may recognize which of the predetermined multiple number of reference gestures the gesture of the user corresponds to.

For example, a 'NO' indication of shaking a finger left and right, a 'Best' indication of holding up a thumb and shaking left and right, an 'OK' indication of making a circle with a thumb and a finger, and the like, can be used as reference gestures.

The present invention may extract feature information for each reference gesture and store the information in a reference database and may compare the information in the established reference database with a future gesture of a user to determine which reference gesture the gesture of the user corresponds to.

Therefore, to practice the present invention, a reference database may first have to be established, and once the reference database is established, the operations for perceiving the gesture of the user may be performed.

This specification first describes a process for establishing a reference database and then describes a process for recognizing the gesture of the user by using the information of the reference database.

Figure 2:
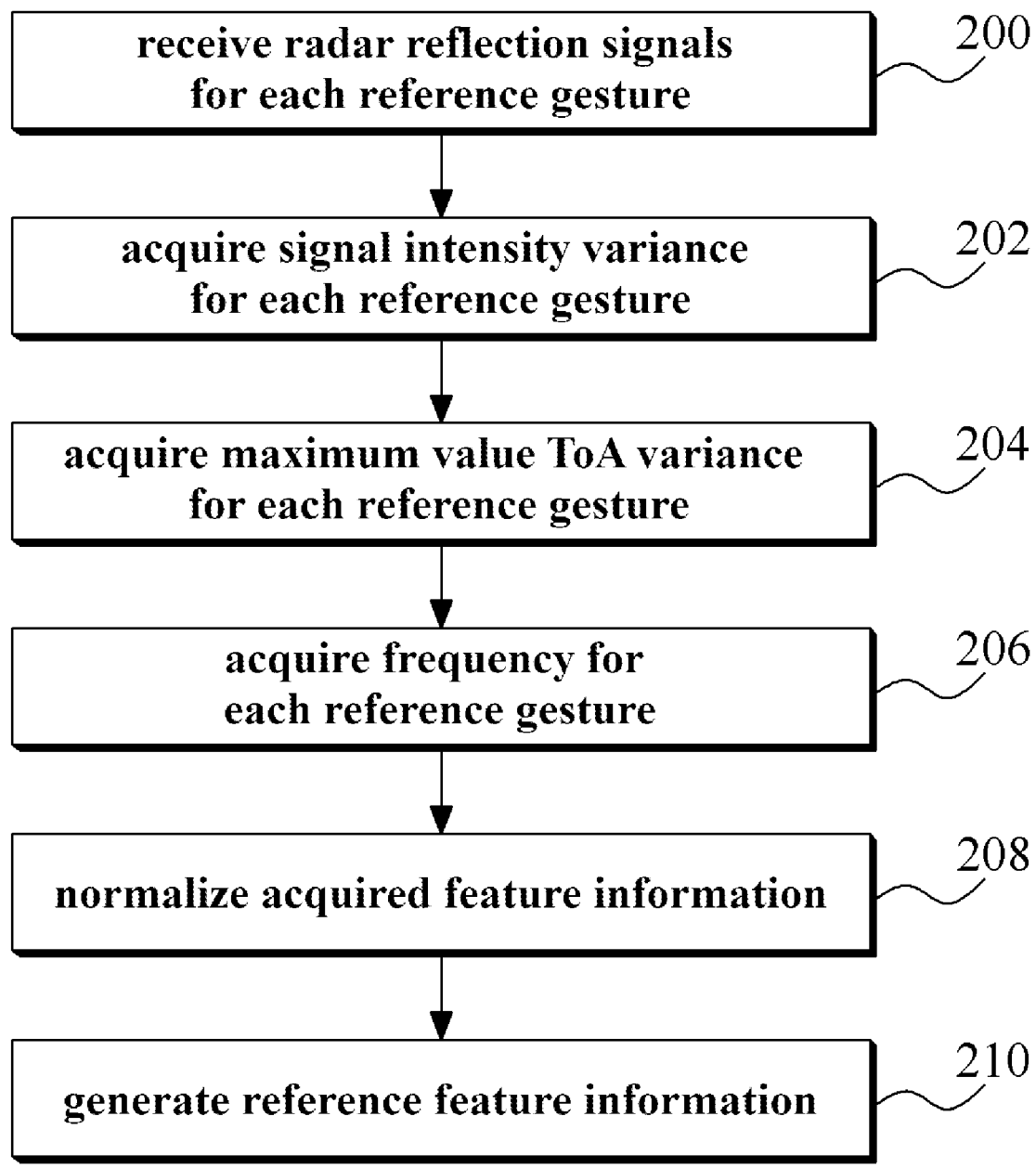
FIG. 2 is a flowchart illustrating a method of establishing a reference database required for gesture recognition according to an embodiment of the present invention.

FIG. 2 is a flowchart illustrating a method of establishing a reference database required for gesture recognition according to an embodiment of the present invention.

Referring to FIG. 2, first, multiple sets of radar reflection signals may be received for each reference gesture (step 200). In order to extract accurate feature information for each reference gesture, it may be preferable that multiple sets of radar reflection signals be received for each reference gesture. Also, for a more accurate extraction of feature information, it may be preferable that one reference gesture be received from various distances and orientations.

A set of radar reflection signals may be received continuously in sample time intervals, where the signals transmitted at a sample time and receive are referred to herein as fast time signals, and signals connected to a particular point (distance) in the fast time signals are referred to herein as slow time signals.

The present invention expresses radar reflection signals in the form of a Wmn matrix, where m is an index representing slow time, and n is an index representing fast time. m is associated with how many times sample signals are to be received for the collection of reflection signals, and n corresponds to the sample time intervals and is associated with the sensing distance of the radar.

It may be preferable that the reflection signals undergo preprocessing, and such preprocessing will be described later on with reference to a separate drawing.

As described above in regard to the related art, the problem in existing methods of gesture recognition using radars is that the received signal information may differ greatly depending on the distance and orientation between the radar sensor and the user, so that accurate gesture recognition may be difficult in cases where the radar signals are not received from a desired distance and angle.

To resolve such problem in the related art, the present invention proposes a gesture recognition method that is robust against the distance and orientation between the radar sensor and the user, and to this end, a method is proposed which uses feature information that is robust against distance and orientation.

When the radar reflection signals are received for each gesture, feature information may be extracted for each gesture, where the feature information robust against distance and orientation as proposed by the present invention includes the variance of the signal intensity values, the variance of the maximum value ToA's, and the frequency of the gesture.

Even for the same gesture, the radar-received signals may display vastly different properties depending on the distance between the radar sensor and the user and the positional relationship between the radar sensor and the user, and this has been a major reason why radar sensors have not been used as general gesture recognition sensors in spite of the various advantages of the radar sensor.

Through various attempts, the inventors of the present invention have discovered that, by expressing the features with the variance of the signal intensities, variance of the maximum value ToA's, and gesture frequency, the features of each gesture can be represented accurately even when there are changes in orientation and distance. The present invention uses the feature information above to establish a reference database.

After receiving radar reflection signals for each reference gesture, a variance of signal intensity values, i.e. one of the feature information used in the present invention, may be acquired for each radar gesture from the radar reflection signals (step 202).

As described above, the radar reflection signals may be expressed in the form of a matrix, and the variance for signal intensity values for the multiple signals forming the matrix may be acquired. The variance of signal intensity values can be acquired by obtaining an average of signal intensity values from the received signals and computing the deviation of the acquired received signals with respect to the obtained average.

When acquiring the variance, it may be preferable to exclude signals having intensity values smaller than or equal to a predetermined value from the variance computation.

Figure 3:
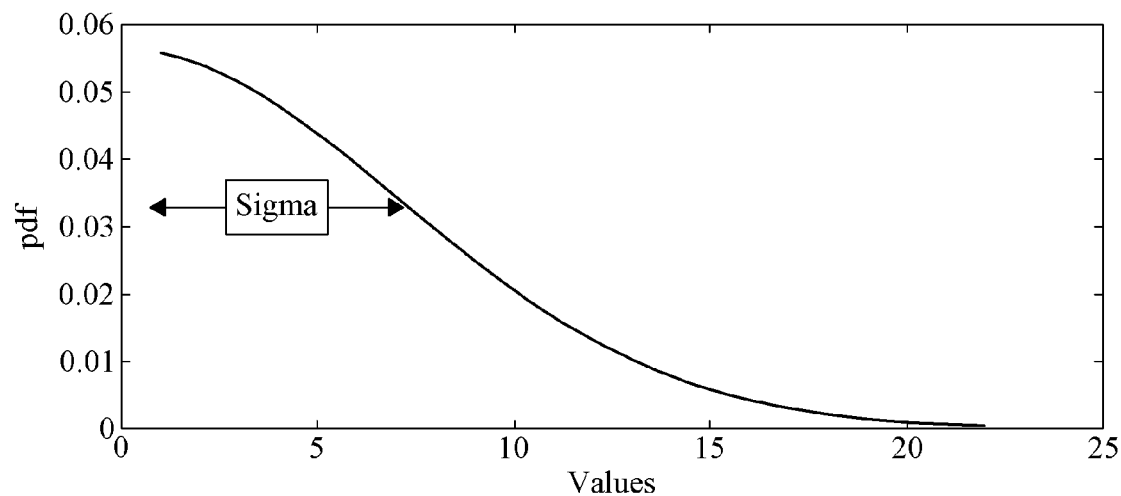
FIG. 3 shows an example of a histogram probability density function for the intensity of acquired signals according to an embodiment of the present invention.

FIG. 3 shows an example of a histogram probability density function for the intensity of acquired signals according to an embodiment of the present invention.

The probability density function illustrated in FIG. 3 is a probability density function shown based on a frequentness of a particular radar reflection signal, where the variance can be the value marked "Sigma" in the probability density function illustrated in FIG. 3.

Also, a variance of the maximum value ToA's may be acquired from the radar reflection signals for each reference gesture (step 204).

Here, a ToA (time of arrival) means the time of arrival from a particular point, and this can be defined by the index n of the fast time signal. A large n for a fast time signal means that the time of arrival of the radar reflection signal is large, which in turn represents a large distance from the radar emitter.

A maximum value ToA refers to the fast time index having the largest signal intensity from among a set of fast time signals. For example, if the fast time indexes range from 1 to 30, and if the maximum value for the signal is detected at fast time index 15, the maximum value ToA can be set to 15.

Since multiple sets of fast time signals are received in sample time intervals, the maximum values for the fast time signals may be different, and the fast time index at which the maximum value is shown may also be different.

The variance of the maximum value ToA's refers to the variance of the ToA values at which maximum values are shown in the multiple sets of fast signals, and this may be acquired by way of computation. The variance of the maximum value ToA's may be computed by acquiring an average of the maximum value ToA's of the fast times and using the average and the deviations of the maximum value ToA's.

It may be preferable that envelope detection be performed for the radar reflection signals in obtaining the maximum value ToA's. Since radar signals are signals of a very high frequency, the maximum values and the ToA's at which the maximum values appear can be detected with greater accuracy when the maximum values are detected for signals having envelope detection applied thereto.

Also, frequency information may be acquired from the radar reflection signals for each reference gesture (step 206).

In a preferred embodiment of the present invention, the frequency information may be acquired such that gestures with large movements and gestures with small movements are differentiated. Generally, the frequency information for radar reflection signals may be acquired by using a Fourier transform such as a FFT (fast Fourier transform) on the radar reflection signals in the time domain.

According to research by the inventors of the present invention, adequate frequency information can be acquired by using a FFT for gestures with small movements. For gestures with relatively large movements, however, there is the problem that adequate movement cannot be acquired by way of a FFT.

Figure 4:
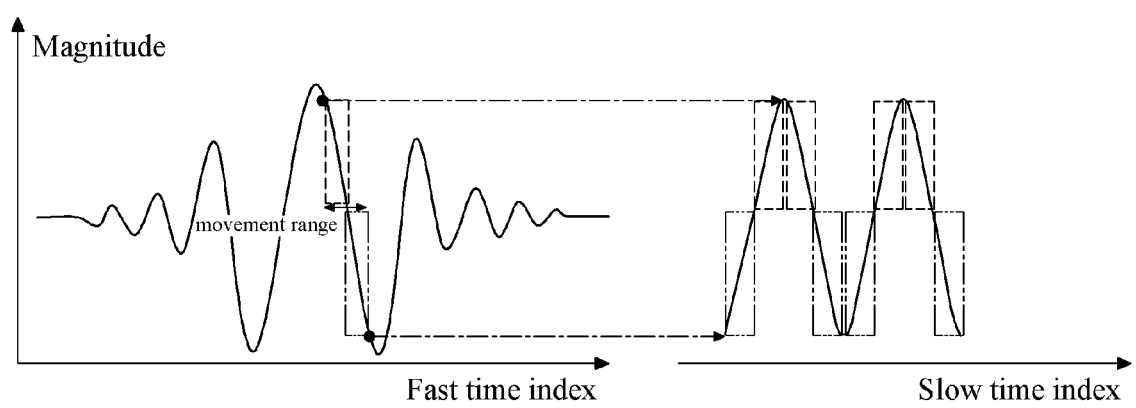
FIG. 4 illustrates fast time signals and slow time signals for a gesture with a small movement.
Figure 5:
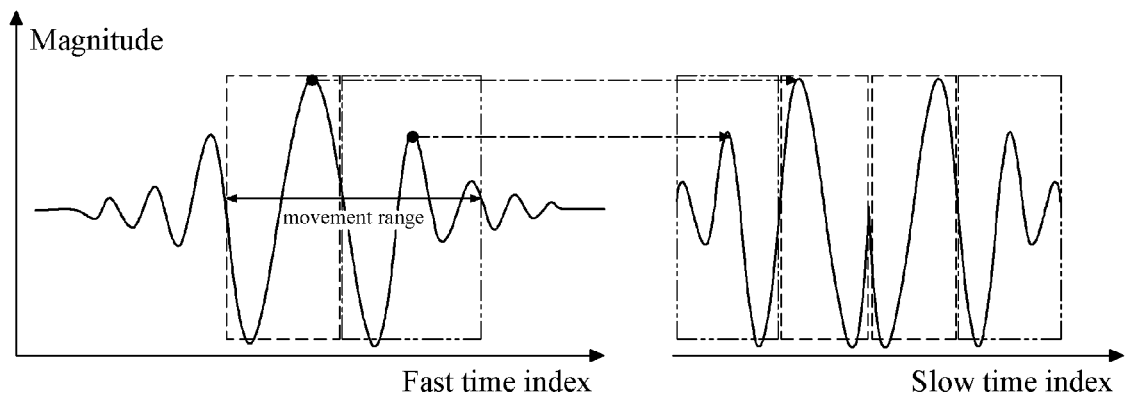
FIG. 5 illustrates fast time signals and slow time signals for a gesture with a large movement.

FIG. 4 and FIG. 5 are diagrams that explain why frequency information cannot be acquired adequately by way of a FFT for a gesture with a large movement.

FIG. 4 illustrates fast time signals and slow time signals for a gesture with a small movement, and FIG. 5 illustrates fast time signals and slow time signals for a gesture with a large movement.

Referring to FIG. 4, it can be observed that a gesture with a small movement has a form that is comparatively close to a sinusoidal wave in the slow time. However, referring to FIG. 5, it can be observed that a gesture with a large movement has a form different from that of a sinusoidal wave, and it would not be adequate to acquire frequency information from signals such as those shown in FIG. 5.

Therefore, the present invention may acquire frequency information for gestures with small movements by using a conventional FFT but may acquire frequency information for gestures with large movements based on ToA's.

Here, the determining of small movements and large movements may be performed using the maximum value ToA variance acquired in step 204. Since reference gestures may be set beforehand in the step of establishing a reference database, frequency information for reference gestures with small movements may be acquired by using a FFT, and frequency information for reference gestures with large movements may be acquired based on ToA's.

Acquiring frequency information by way of a FFT may include transforming the radar reflection signals by a FFT into frequency domain signals and acquiring the frequency corresponding to the peak value in the frequency domain signals as the frequency information.

Figure 8:
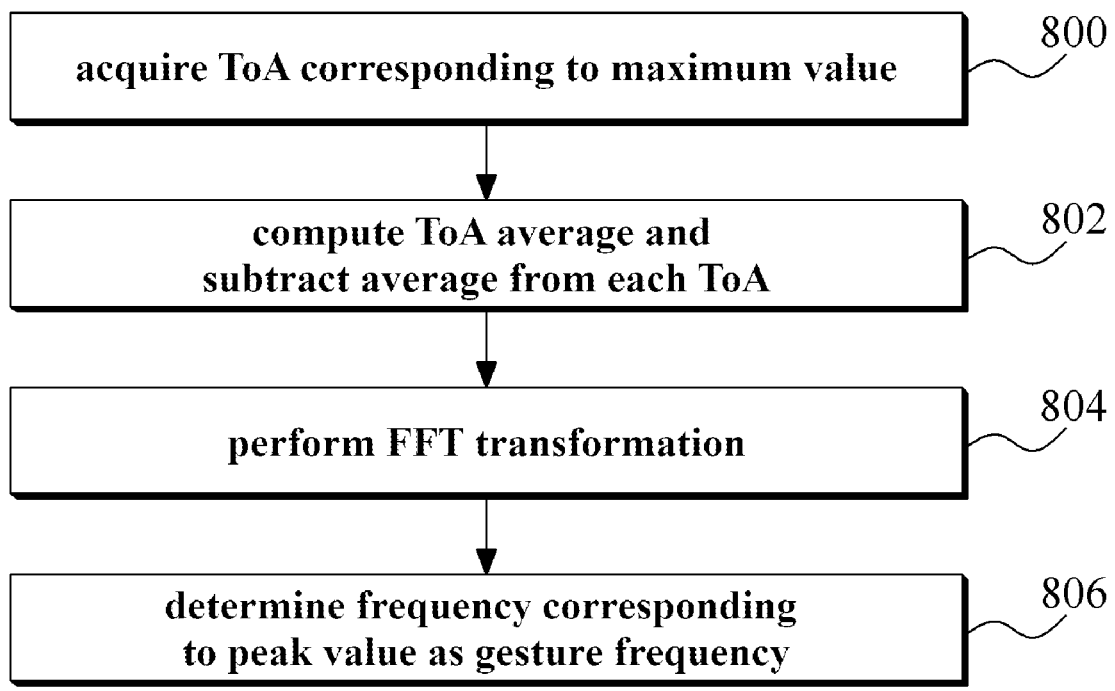
FIG. 8 is a flowchart illustrating a method of acquiring frequency information based on ToA's for a gesture with a large movement.

FIG. 8 is a flowchart illustrating a method of acquiring frequency information based on ToA's for a gesture with a large movement.

Referring to FIG. 8, the ToA corresponding to the maximum value for each fast time may be acquired (step 800).

This is the same as the operation for detecting the ToA's corresponding to the maximum values when obtaining the maximum value ToA variance described above.

The average of the ToA's corresponding to the maximum values of the fast times may be obtained, and the calculated average may be subtracted from the ToA's corresponding to the maximum values (step 802).

Using a FFT on the ToA signals from which the average has been subtracted in step 802, the signals may be transformed into frequency domain signals (step 804).

The frequency corresponding to the peak value in the signals transformed into the frequency domain in step 804 may be determined as the frequency of the gesture (step 806).

The acquiring of the three types of feature information in step 200 to step 206 may be performed for multiple test gestures, and normalization may be performed for the acquired feature information (step 208).

Normalizing the feature information may be performed for each set of feature information, and normalization may be performed such that each set of feature information is within a range of 0~1.

For example, suppose 1,000 sets of signal intensity variance were acquired as the signal intensity variances of a first reference gesture. Here, the normalization may be performed using the largest value from among the acquired signal intensity variance information. That is, the acquired variance information may be divided by the largest variance information. The same applies also for the other types of feature information, namely the maximum value ToA variance information and frequency information.

When the normalization is performed, reference feature information may be generated for each reference gesture by using the normalized feature information and may be stored in a reference database (step 210).

The reference feature information can take various forms. It is also possible to use an average value of the acquired sets of feature information as the reference feature information. Alternatively, a probability density function of the acquired sets of feature information can be used for the reference feature information. Also, it is possible to use clusters resulting from a K-means clustering applied on the acquired sets of feature information as the reference feature information.

Figure 9:
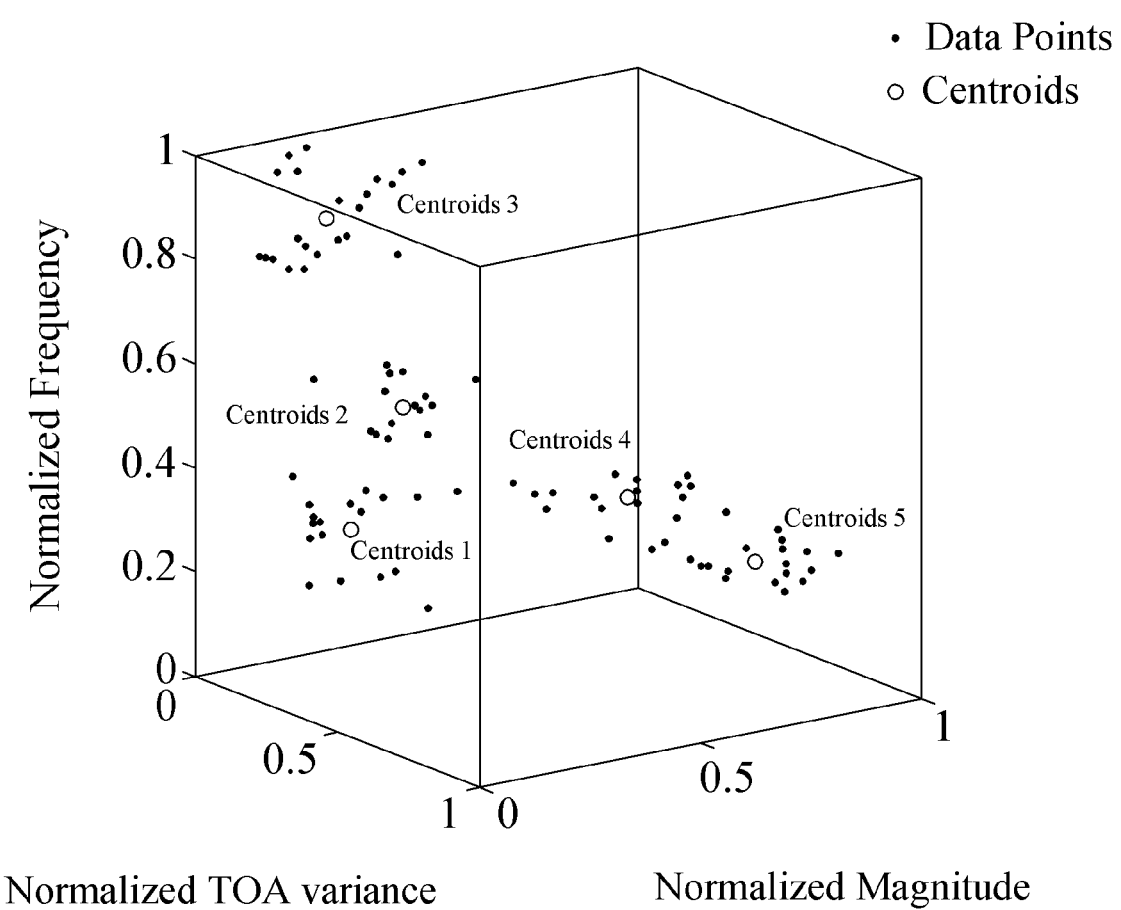
FIG. 9 shows an example of reference feature information generated according to an embodiment of the present invention as expressed in the form of a K-means cluster.

FIG. 9 shows an example of reference feature information generated according to an embodiment of the present invention as expressed in the form of a K-means cluster.

Referring to FIG. 9, it can be observed that clusters may be formed for each reference gesture (Gesture 1, Gesture 2, Gesture 3, Gesture 4, Gesture 5) according to the normalized ToA variances, normalized signal intensity variances, and normalized frequencies.

Instead of the K-means clustering illustrated in FIG. 9, it is also possible to form K-means clusters by including the ToA's of the collected feature information as additional input. This may allow gesture recognition that is more robust against distance.

It should be apparent to the skilled person that the reference feature information can be stored in various forms other than those involving the probability density function, clustering, and average values.

The subsequent gesture sensing may be performed by way of extracting feature information from radar reflection signals and comparing the extracted feature information with the reference feature information.

Figure 6:
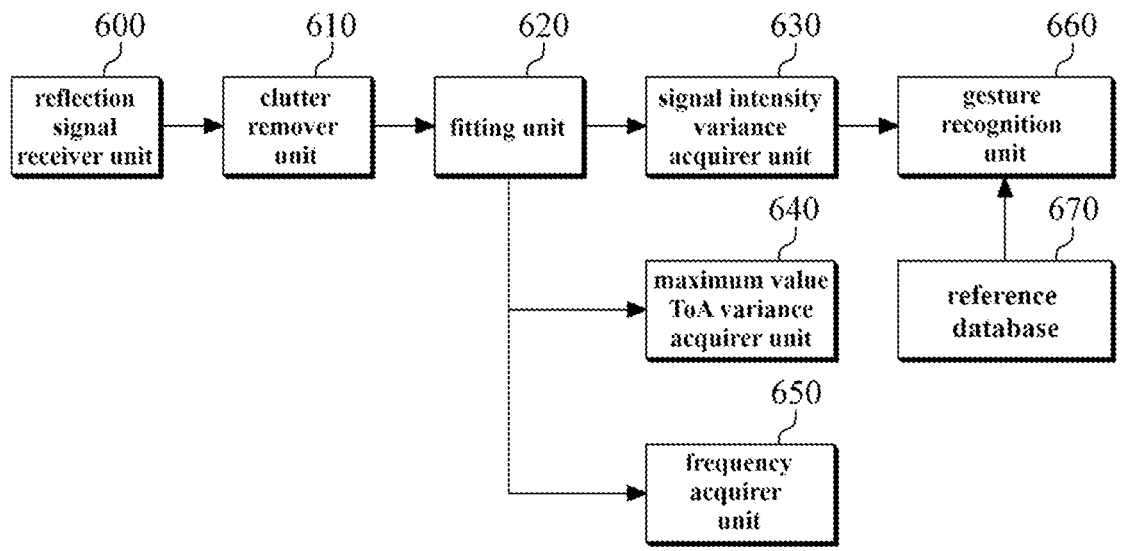
FIG. 6 is a block diagram illustrating the structure of a gesture sensing device according to an embodiment of the present invention.

FIG. 6 is a block diagram illustrating the structure of a gesture sensing device according to an embodiment of the present invention.

Referring to FIG. 6, a gesture sensing device according to an embodiment of the present invention may include a reflection signal receiver unit 600, a clutter remover unit 610, a fitting unit 620, a signal intensity variance acquirer unit 630, a maximum value ToA variance acquirer unit 640, a frequency acquirer unit 650, a gesture recognition unit 660, and a reference database 670.

The reflection signal receiver unit 600 may receive the reflection signals that are reflected in correspondence to the multiple radar signals transmitted in sample time intervals.

The clutter remover unit 610 may serve to remove the clutter component from the received reflection signals. The clutter is a component that hinders the acquiring of desired information from the received signals and for example may be a signal component created by the background, etc. As objects that create a clutter component are stationary, these are included in previous signals as well, and as such, the clutter component may be removed by using previous signals. Methods for removing clutter are widely known, and the clutter can be removed by any known method.

According to an embodiment of the present invention, the clutter can be removed by using a loopback filter, where the clutter removal using a loopback filter can be expressed as in Equation 1 shown below.

$$c_k(t)=\partial c_{k-1}(t)+(1-\partial)r_k(t)$$

$$y_k(t)=r_k(t)-c_k(t) \quad \text{[Equation 1]}$$

In the equation above, α is a weight constant, $c_k(t)$ represents the clutter component in the k-th received signal, $r_k(t)$ represents the k-th received signal (signal received after reflection), and $y_k(t)$ represents the resulting signal after removing the clutter from the received signal.

Although it was not mentioned in the method of establishing the reference database in FIG. 2, such clutter removal may also be performed in the reference database establishment process, and the radar reflection signals may substantially refer to signals obtained after removing the clutter from the received signals.

As described above, the signals from which the clutter has been removed may have the form of an m×n matrix and may be composed of multiple fast time signals.

The fitting unit 620 may determine whether the gesture corresponding to the received reflection signals is a gesture intended for a particular interfacing (an intentional reference gesture) or a meaningless gesture.

The gesture of the user can either be a reference gesture intended for a particular interfacing or can be a gesture with no particular intention. The fitting unit 620 may determine whether or not the gesture of the user is an intentional gesture, and this may be determined by the periodicity of the gesture. The determining of an intentional gesture can be based on whether or there is periodicity in the gesture, since a gesture for interfacing generally has periodicity.

According to a preferred embodiment of the present invention, the determining of whether or not there is periodicity may be performed by using two different types of fitting.

A first fitting method may be a sinusoidal fitting method and may entail determining whether or not the radar reflection signals match a sinusoidal wave to a certain degree.

Figure 10:
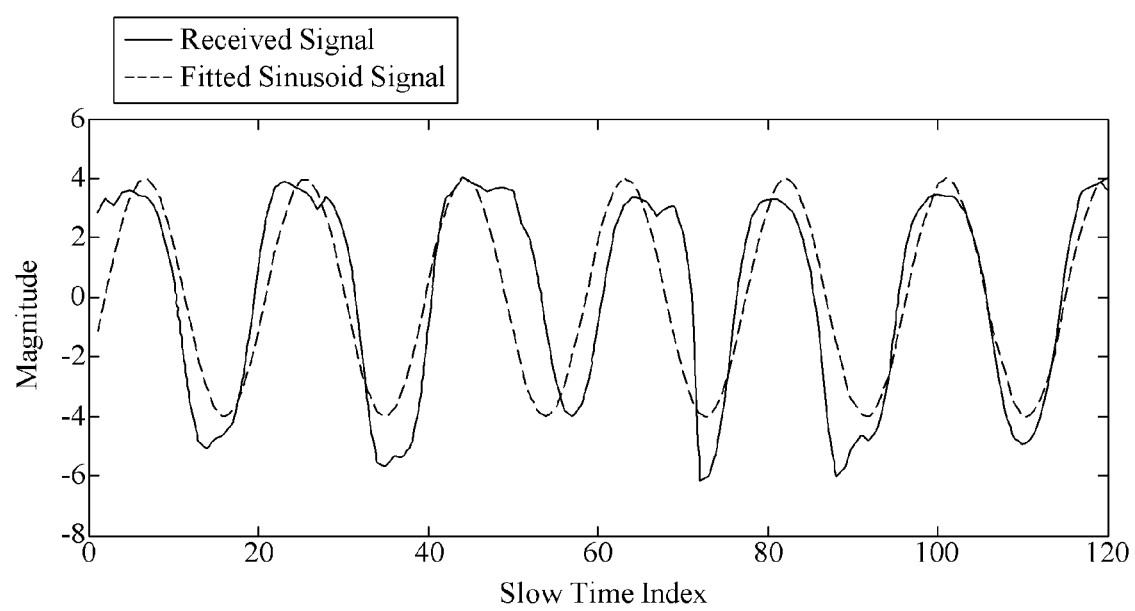
FIG. 10 shows an example of a sinusoidal fitting.

FIG. 10 shows an example of a sinusoidal fitting.

Referring to FIG. 10, the radar reflection signals (Received Signal) may be compared with a sinusoidal signal (Sinusoid Signal) for fitting to determine whether or not there is a certain degree of matching. The higher the matching rate, the higher the periodicity the signal may be determined to have, and signals showing a matching rate of a particular threshold value or higher may be determined as being signals for an intentional gesture.

However, with gestures involving large movements, it may be difficult to determine whether or not there is periodicity by using the sinusoidal fitting method. Therefore, the present invention may us the R-square value as a second fitting method.

The R-square value may be defined as in Equation 2 below.

$$R^2 = 1 - \frac{\sum_{i=1}^{n}(y_i - \hat{y}_i)^2}{\sum_{i=1}^{n}(y_i - \bar{y})^2}$$ [Equation 2]

In Equation 2 above, $\hat{y}_i$ is a signal predicted according to the fitting algorithm for the radar reflection signal $y_i$, and $\bar{y}$ represents the average of the radar reflection signals $y_i$. Prediction based on a fitting algorithm is known in the art and, as such, will not be described here in further detail.

Higher values of the R-square in Equation 2 represent higher periodicity, and if an R-square value greater than or equal to a particular threshold value is computed, this may be determined to be an intended gesture.

Since it is not known beforehand whether the gesture of the user is a gesture with a large movement or a gesture with a small movement, the first fitting method and the second fitting method may both be applied, after which the gesture can be determined as being an intentional gesture if either method provides a value greater than or equal to a threshold value.

The signal intensity variance acquirer unit 630 may acquire the variance for signal intensities from the radar reflection signals (signals from which the clutter has been removed). As described above, an average of the signal intensity values may be calculated, and deviation information obtained by subtracting the average from each set of signals may be used to compute the variance for the signal intensities.

The maximum value ToA variance acquirer unit 640 may acquire the variance for ToA values corresponding to maximum values in the fast time signals of the radar reflection signals (signals from which the clutter has been removed). As described above, an average of the ToA values corresponding to the maximum values in the fast time signals may be calculated, and deviation information obtained by subtracting the average from the ToA values corresponding to the maximum values may be used to compute the variance for the maximum value ToA's.

The frequency acquirer unit 650 may acquire the frequency for the radar reflection signals (signals from which the clutter has been removed). In the step for establishing the reference database, it would be known beforehand whether the gestures corresponding to the radar reflection signals are gestures with large movements or gestures with small movements, and therefore a method of acquiring frequency based on a FFT or a method of acquiring frequency based on ToA's can be applied selectively.

However, when recognizing a gesture of the user, it cannot be identified beforehand whether the gesture of the user is a gesture with a large movement or a gesture with a small movement.

To determine whether a gesture of the user is a gesture with a large movement or a gesture with a small movement, the maximum value ToA variance information may be used. If the maximum value ToA variance is greater than or equal to a predetermined threshold value, then it may be determined that the gesture is a gesture having a large movement. However, if the maximum value ToA variance is smaller than or equal to a predetermined threshold value, then it may be determined that the gesture is a gesture having a small movement.

If it is determined that the gesture is a gesture having a small movement, a FFT may be performed on the radar reflection signals, and a frequency corresponding to the peak value may be determined as the frequency of the user gesture.

Conversely, if it is determined that the gesture is a gesture having a large movement, then the frequency of the user gesture may be determined according to a method such as that illustrated in FIG. 8.

When the signal intensity variance, maximum value ToA variance, and frequency are determined for the user gesture, the gesture recognition unit 660 may use the feature information above to determine which reference gesture the gesture of the user corresponding to.

The gesture recognition unit 660 may use the feature information (signal intensity variance, maximum value ToA variance, and frequency) extracted from the radar reflection signals together with the reference feature information of the reference database to determine which reference gesture the gesture of the user corresponds to.

The gesture recognition unit 660 may perform gesture recognition after normalizing the feature information (signal intensity variance, maximum value ToA variance, and frequency), where the normalization constant used for the normalization may preferably be the same constant as the normalization constant used when generating the reference feature information.

If the reference feature information is stored in the reference database in the form of K-means clusters, the gesture recognition unit 660 can recognize the gesture of the user by computing which cluster from among the clusters associated with the reference gestures is the closest to the extracted feature information. More specifically, the Euclidean distances between the extracted feature information and the centers of the clusters for the reference gestures in a K-means space may be computed, and the reference gesture corresponding to the cluster having the closest Euclidean distance may be determined to be the gesture of the user.

In cases where the reference feature information of the reference database includes information of other forms, the gesture recognition unit 660 may operate to recognize the gesture of the user by way of a similarity comparison between the extracted feature information and the reference feature information of the reference database.

Figure 7:
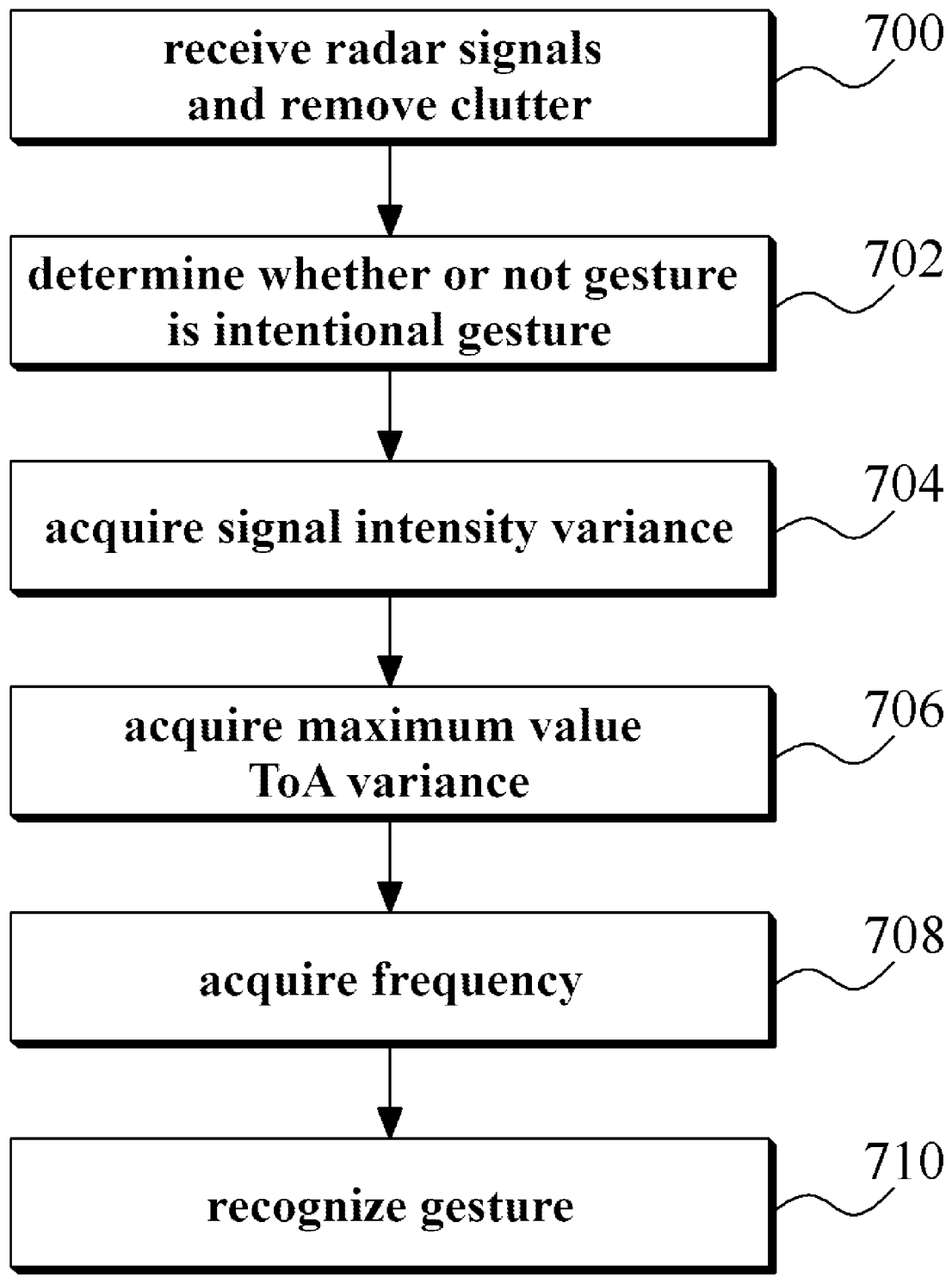
FIG. 7 is a flowchart illustrating the overall flow of a gesture recognition method using a radar according to an embodiment of the present invention.

FIG. 7 is a flowchart illustrating the overall flow of a gesture recognition method using a radar according to an embodiment of the present invention.

Referring to FIG. 7, radar signals for a gesture of the user may be received, and clutter may be removed from the received signals (step 700).

It may be determined by way of a fitting procedure whether the radar reflection signals having the clutter removed therefrom are signals for an intended gesture or signals for a gesture unrelated to an interfacing intent (step 702). Here, the fitting may be for determining whether or not the signals have periodicity and, as described above, may include performing sinusoidal fitting for gestures with small movements and R-square fitting for gestures with large movements and determining that the gesture is an intentional gesture if the result of either of the two types of fitting provide a value greater than or equal to a threshold value.

A variance for the signal intensity values may be acquired from the radar reflection signals from which the clutter has been removed (step 704). After the average of the radar reflection signal intensity values is computed, the computed average value may be used to acquire the variance for the signal intensities.

A maximum value ToA variance may be acquired from the radar reflection signals from which the clutter has been removed (step 706). ToA's corresponding to the maximum values may be acquired from the multiple fast time signals forming the radar reflection signals, and a variance of the acquired ToA's may be computed.

A frequency may be acquired from the radar reflection signals from which the clutter has been removed (step 708). Depending on the extent of movement of the gesture, the frequency may be acquired using different methods. The extent of movement of the gesture may be determined by the maximum value ToA variance acquired above. If the maximum value ToA variance is smaller than the predetermined threshold value, the frequency may be acquired by way of a typical FFT computation. If the maximum value ToA variance is greater than the predetermined threshold value, the frequency of the user gesture may be determined by a method such as that illustrated in FIG. 4.

Once the signal intensity variance, maximum value ToA variance, and frequency are acquired as feature information, the acquired feature information and the information of the reference database may be used to recognize the gesture of the user (step 710). Through a similarity computation between the acquired feature information and the reference feature information of the reference database, it may be determined which reference data the gesture of the user corresponds to. As described above, it may be preferable to recognize the gesture after applying normalization on the signal intensity variance, maximum value ToA variance, and frequency.

The gesture recognition device and method based on the present invention described above can be utilized in gesture recognition for various purposes and, in particular, can be utilized efficiently for recognizing the gestures of a driver in an environment where bright lighting cannot always be provided.

While the present invention is described above by way of limited embodiments and drawings that refer to particular details such as specific elements, etc., these are provided only to aid the general understanding of the present invention. The present invention is not to be limited by the embodiments above, and the person having ordinary skill in the field of art to which the present invention pertains would be able to derive numerous modifications and variations from the descriptions and drawings above. Therefore, it should be appreciated that the spirit of the present invention is not limited to the embodiments described above. Rather, the concepts set forth in the appended scope of claims as well as their equivalents and variations are encompassed within the spirit of the present invention.

What is claimed is:

1. A gesture recognition device using a radar, the gesture recognition device comprising:
    a signal receiver processor configured to receive radar signals reflected by a gesture of a user;
    a clutter remover processor configured to remove clutter from the signals received at the signal receiver processor;
    a signal intensity variance acquirer processor configured to acquire a variance of signal intensity values from the reflected signals having the clutter removed therefrom;
    a times of arrival (ToA) variance acquirer processor configured to acquire ToA's corresponding to maximum values of fast time signals forming the reflected signals having the clutter removed therefrom and configured to acquire a variance of the acquired ToA's corresponding to the maximum values;
    a frequency acquirer processor configured to compute a frequency of the reflected signals having the clutter removed therefrom;
    a reference database configured to store reference feature information of a predetermined plurality of reference gestures; and
    a gesture recognition processor configured to determine which reference gesture the gesture of the user corresponds to by using the signal intensity variance, the maximum value ToA variance, the frequency, and the reference feature information stored in the reference database.

2. The gesture recognition device according to claim 1, further comprising a fitting processor configured to determine whether or not the gesture is an intended gesture having intentional periodicity in the reflected signals having the clutter removed therefrom.

3. The gesture recognition device according to claim 1, wherein the frequency acquirer processor determines whether the gesture of the user is a gesture with a large movement or a gesture with a small movement based on the maximum value ToA variance.

4. The gesture recognition device according to claim 3, wherein the frequency acquirer processor performs a fast Fourier transform (FFT) on the reflected signals having the clutter removed therefrom to compute the frequency, if the gesture of the user is determined to be the gesture with the small movement.

5. The gesture recognition device according to claim 3, wherein the frequency acquirer processor computes the frequency by subtracting an average of the ToA's corresponding to the maximum values from the ToA corresponding to the maximum value for each of the fast time signals and performing the FFT on resultant signals, if the gesture of the user is determined to be the gesture with the large movement.

6. The gesture recognition device according to claim 3, wherein the fitting processor determines whether or not a signal has periodicity by way of a sinusoidal fitting for the gesture with the small movement and determines whether or not the signal has periodicity by way of an R-square fitting for the gesture with the large movement.

7. The gesture recognition device according to claim 1, wherein the reference feature information comprises a signal intensity variance, a maximum value ToA variance, and K-means clustering information for frequency for each reference gesture.

8. The gesture recognition device according to claim 7, wherein the gesture recognition processor recognizes a gesture by using the signal intensity variance, maximum value ToA variance, and frequency acquired from the gesture of the user and distance information from a cluster center in a K-means space for each of the reference gestures.

9. The gesture recognition device according to claim 1, wherein the gesture recognition processor performs gesture recognition after normalizing the signal intensity variance, maximum value ToA variance, and frequency.

10. A gesture recognition method using a radar, the gesture recognition method comprising:
(a) receiving radar signals reflected by a gesture of a user;
(b) removing clutter from the signals received at said step (a);
(c) acquiring a signal intensity variance from the reflected signals having the clutter removed therefrom;
(d) acquiring times of arrival (ToA's) corresponding to maximum values of fast time signals forming the reflected signals having the clutter removed therefrom and acquiring a maximum value ToA variance defined as a variance of the acquired ToA's corresponding to the maximum values;
(e) computing and acquiring a frequency of the reflected signals having the clutter removed therefrom; and
(f) determining which reference gesture the gesture of the user corresponds to by using 'reference feature information of a predetermined plurality of reference gestures and the signal intensity variance, the maximum value ToA variance, and the frequency.

11. The gesture recognition method according to claim 10, wherein said step (e) comprises determining whether the gesture of the user is a gesture with a large movement or a gesture with a small movement based on the maximum value ToA variance.

12. The gesture recognition method according to claim 10, wherein said step (e) comprises performing a fast Fourier transform (FFT) on the reflected signals having the clutter removed therefrom to compute the frequency, if the gesture of the user is determined to be a gesture with a small movement, and computing the frequency by subtracting an average of the ToA's corresponding to the maximum values from the ToA corresponding to the maximum value for each of the fast time signals and performing the FFT on the resultant signals, if the gesture of the user is determined to be a gesture with a large movement.

13. The gesture recognition method according to claim 10, wherein the reference feature information comprises a signal intensity variance, a maximum value ToA variance, and K-means clustering information for frequency for each reference gesture.

14. The gesture recognition method according to claim 13, wherein said step (f) comprises recognizing a gesture by using the signal intensity variance, maximum value ToA variance, and frequency acquired from the gesture of the user and distance information from a cluster center in a K-means space for each of the reference gestures.

15. The gesture recognition method according to claim 10, further comprising normalizing the acquired signal intensity variance, maximum value ToA variance, and frequency.

* * * * *